(12) United States Patent
Ni et al.

(10) Patent No.: US 11,539,890 B2
(45) Date of Patent: Dec. 27, 2022

(54) PHOTOGRAPHING LENS

(71) Applicant: Changzhou AAC Raytech Optronics Co., Ltd., Changzhou (CN)

(72) Inventors: Tianheng Ni, Shenzhen (CN); Feng Yan, Shenzhen (CN); Suohe Wei, Shenzhen (CN)

(73) Assignee: Changzhou AAC Raytech Optronics Co., Ltd., Changzhou (CN)

(*) Notice: Subject to any disclaimer, the term of this patent is extended or adjusted under 35 U.S.C. 154(b) by 0 days.

(21) Appl. No.: 17/541,295

(22) Filed: Dec. 3, 2021

(65) Prior Publication Data
US 2022/0182548 A1 Jun. 9, 2022

(30) Foreign Application Priority Data
Dec. 8, 2020 (CN) .......................... 202022915665.9

(51) Int. Cl.
*H04N 5/232* (2006.01)
*H04N 5/225* (2006.01)
*G03B 5/00* (2021.01)

(52) U.S. Cl.
CPC .......... *H04N 5/23287* (2013.01); *G03B 5/00* (2013.01); *H04N 5/2252* (2013.01); *G03B 2205/0053* (2013.01)

(58) Field of Classification Search
CPC .... G03B 2205/0023; G03B 2205/0053; G03B 2205/0069; G03B 5/00; G03B 5/06; H04N 5/2252; H04N 5/2254; H04N 5/23287
See application file for complete search history.

(56) References Cited

U.S. PATENT DOCUMENTS

| | | | |
|---|---|---|---|
| 9,515,542 B2* | 12/2016 | Kim | H02K 5/10 |
| 2018/0356646 A1* | 12/2018 | Hu | G03B 13/36 |
| 2019/0020799 A1* | 1/2019 | Minamisawa | H05K 1/0203 |
| 2020/0348532 A1* | 11/2020 | Park | H04N 5/23287 |
| 2020/0393637 A1* | 12/2020 | Ryoo | H02N 2/142 |
| 2022/0244487 A1* | 8/2022 | Hu | G02B 7/028 |

* cited by examiner

*Primary Examiner* — Amy R Hsu
(74) *Attorney, Agent, or Firm* — W&G Law Group

(57) ABSTRACT

A photographing lens is provided, including a mounting framework, a lens module and an image stabilization module, where the image stabilization module includes a movable holder, a frame, a first rotation assembly, a second rotation assembly, a first elastic member, a second elastic member, a third elastic member and a fourth elastic member; the first elastic member includes a first fixing piece, a second fixing piece, and a first elastic piece connected between the first fixing piece and the second fixing piece; the second elastic member includes a third fixing piece, a fourth fixing piece, and a second elastic piece connected between the third fixing piece and the fourth fixing piece. The present invention solves the technical problems of the complex structure and increased thickness of the photographing lens for realizing the rotational reset of the lens module in the related art.

10 Claims, 10 Drawing Sheets

PHOTOGRAPHING LENS

TECHNICAL FIELD

The present invention relates to the technical field of lenses, and in particular to a photographing lens.

BACKGROUND

Optical Image Stabilization (OIS) refers to the configuration of an optical component, such as a lens, in a camera or other similar imaging instruments to prevent or compensate for the instrument shake in the process of capturing optical signals, so as to improve the imaging quality.

For the existing photographing lenses, optical image stabilization is implemented by rotating a lens module. After the photographing is completed, the lens module needs to be reset for the next shooting. However, the existing reset structure is complex and increases the thickness of the photographing lens.

Therefore, there is a need to provide a novel photographing lens to solve the above problems.

SUMMARY

An objective of the present invention is to provide a photographing lens, in order to solve the technical problems of complex structure and increased thickness of the photographing lens in the related art for realizing the rotational reset of a lens module.

To this end, the present invention provides A photographing lens, which includes a mounting framework, a lens module received in the mounting framework, and an image stabilization module for driving the lens module to rotate, the mounting framework having a first diagonal and a second diagonal; the image stabilization module including a movable holder suspended in the mounting framework, a frame used for receiving the lens module and suspended in the movable holder, a first rotation assembly arranged between the mounting framework and the movable holder along the first diagonal, and a second rotation assembly arranged between the movable holder and the frame along the second diagonal, the image stabilization module further includes a first elastic member and a second elastic member oppositely arranged at two corners of the mounting framework along the first diagonal, and a third elastic member and a fourth elastic member oppositely arranged at two corners of the movable holder along the second diagonal; the first elastic member includes a first fixing piece connected to the mounting framework, a second fixing piece connected to the movable holder, and a first elastic piece connected between the first fixing piece and the second fixing piece; the second elastic member includes a third fixing piece connected to the mounting framework, a fourth fixing piece connected to the movable holder, and a second elastic piece connected between the third fixing piece and the fourth fixing piece; the third elastic member includes a fifth fixing piece connected to the movable holder, a sixth fixing piece connected to the frame, and a third elastic piece connected between the fifth fixing piece and the sixth fixing piece; and the fourth elastic member includes a seventh fixing piece connected to the movable holder, an eighth fixing piece connected to the frame, and a fourth elastic piece connected between the seventh fixing piece and the eighth fixing piece.

As an improvement, the mounting framework is provided with a first clearance groove and a second clearance groove which are oppositely arranged along the first diagonal; the movable holder includes a movable holder body received in the mounting framework, a first support plate extending from the movable holder body into the first clearance groove, and a second support plate extending from the movable holder body into the second clearance groove; a groove bottom of the first clearance groove is provided with a first rotation groove, and the first support plate is provided with a second rotation groove opposite the first rotation groove; a groove bottom of the second clearance groove is provided with a third rotation groove, and the second support plate is provided with a fourth rotation groove opposite the third rotation groove;

the movable holder is provided with a third clearance groove and a fourth clearance groove which are oppositely arranged along the second diagonal; the frame includes a frame body received in the movable holder, a third support plate extending from the frame body into the third clearance groove, and a fourth support plate extending from the frame body into the fourth clearance groove; a groove bottom of the third clearance groove is provided with a fifth rotation groove, and the third support plate is provided with a sixth rotation groove opposite the fifth rotation groove; a groove bottom of the fourth clearance groove is provided with a seventh rotation groove, and the fourth support plate is provided with an eighth rotation groove opposite the seventh rotation groove;

where the first rotation assembly includes a first rotating ball and a second rotating ball, and the second rotation assembly includes a third rotating ball and a fourth rotating ball; the first rotating ball is partially received in the first rotation groove, and partially received in the second rotation groove; the second rotating ball is partially received in the third rotation groove, and partially received in the fourth rotation groove; the third rotating ball is partially received in the fifth rotation groove, and partially received in the sixth rotation groove; and the fourth rotating ball is partially received in the seventh rotation groove, and partially received in the eighth rotation groove.

As an improvement, the second fixing piece is fixed to the first support plate, and the fourth fixing piece is fixed to the second support plate; and the sixth fixing piece and the eighth fixing piece are relatively fixed to the frame body along the second diagonal.

As an improvement, the mounting framework is formed by a first border plate, a second border plate, a third border plate and a fourth border plate sequentially connected and enclosing a space in the center, and the movable holder body includes a first enclosing plate arranged opposite the first border plate, a second enclosing plate arranged opposite the second border plate, a third enclosing plate arranged opposite the third border plate, and a fourth enclosing plate arranged opposite the fourth border plate;

the first fixing piece includes a first fixing portion connected to the first border plate and a second fixing portion connected to the fourth border plate, and the first elastic piece includes a first elastic arm connected between the first fixing portion and the second fixing piece and a second elastic arm connected between the second fixing portion and the second fixing piece;

the third fixing piece includes a third fixing portion connected to the second border plate and a fourth fixing portion connected to the third border plate, and the second elastic piece includes a third elastic arm connected between the third fixing portion and the fourth fixing piece and a fourth elastic arm connected between the fourth fixing portion and the fourth fixing piece;

the fifth fixing piece includes a fifth fixing portion connected to the first enclosing plate and a sixth fixing portion connected to the second enclosing plate, and the third elastic piece includes a fifth elastic arm connected between the fifth fixing portion and the sixth fixing piece and a sixth elastic arm connected between the sixth fixing portion and the sixth fixing piece; and the seventh elastic piece includes a seventh fixing portion connected to the third enclosing plate and an eighth fixing portion connected to the fourth enclosing plate, and the fourth elastic piece includes a seventh elastic arm connected between the seventh fixing portion and the eighth fixing piece and an eighth elastic arm connected between the eighth fixing portion and the eighth fixing piece.

As an improvement, the first elastic arm at least includes two first bent portions with oppositely orientated openings, and the second elastic arm at least includes two second bent portions with oppositely orientated openings; and the third elastic arm at least includes two third bent portions with oppositely orientated openings, and the fourth elastic arm at least includes two fourth bent portions with oppositely orientated openings.

As an improvement, in a direction parallel to a central axis of the lens module, one of the first bent portions at least partially overlaps the first enclosing plate, and the other first bent portion at least partially overlaps the first border plate; one of the second bent portions at least partially overlaps the fourth enclosing plate, and the other second bent portion at least partially overlaps the fourth border plate; one of the third bent portions at least partially overlaps the second enclosing plate, and the other third bent portion at least partially overlaps the second border plate; and one of the fourth bent portions at least partially overlaps the third enclosing plate, and the other fourth bent portion at least partially overlaps the third border plate.

As an improvement, the fifth elastic arm includes a fifth bent portion formed by extending from the fifth fixing portion along the first enclosing plate and toward the second diagonal, and a sixth bent portion connected between the fifth bent portion and the sixth fixing piece; the sixth elastic arm includes a seventh bent portion formed by extending from the sixth fixing portion along the second enclosing plate and toward the second diagonal, and an eighth bent portion connected between the seventh bent portion and the sixth fixing piece;

the seventh elastic arm includes a ninth bent portion formed by extending from the seventh fixing portion along the third enclosing plate and toward the second diagonal, and a tenth bent portion connected between the ninth bent portion and the eighth fixing piece; and the eighth elastic arm includes an eleventh bent portion formed by extending from the eighth fixing portion along the fourth enclosing plate and toward the second diagonal, and a twelfth bent portion connected between the eleventh bent portion and the eighth fixing piece.

As an improvement, in a direction parallel to a central axis of the lens module, the fifth bent portion partially overlaps the first enclosing plate and partially overlaps the third support plate, and the seventh bent portion partially overlaps the second enclosing plate and partially overlaps the third support plate; and the ninth bent portion partially overlaps the third enclosing plate and partially overlaps the fourth support plate, and the eleventh bent portion partially overlaps the fourth enclosing plate and partially overlaps the fourth support plate.

As an improvement, the first elastic arm and the second elastic arm are symmetrically arranged about the first diagonal, and the third elastic arm and the fourth elastic arm are symmetrically arranged about the first diagonal; and the fifth elastic arm and the sixth elastic arm are symmetrically arranged about the second diagonal, and the seventh elastic arm and the eighth elastic arm are symmetrically arranged about the second diagonal.

As an improvement, the first fixing portion is provided with a first positioning hole, and the first border plate is provided with a protrusion for forming a first positioning column received in the first positioning hole; the second fixing portion is provided with a second positioning hole, and the fourth border plate is provided with a protrusion for forming a second positioning column received in the second positioning hole; the second fixing piece is provided with a third positioning hole, and the first support plate is provided with a protrusion for forming a third positioning column received in the third positioning hole;

the third fixing portion is provided with a fourth positioning hole, and the second border plate is provided with a protrusion for forming a fourth positioning column received in the fourth positioning hole; the fourth fixing portion is provided with a fifth positioning hole, and the third border plate is provided with a protrusion for forming a fifth positioning column received in the fifth positioning hole; the fourth fixing piece is provided with a sixth positioning hole, and the second support plate is provided with a protrusion for forming a sixth positioning column received in the sixth positioning hole;

the fifth fixing portion is provided with a seventh positioning hole, and the first enclosing plate is provided with a protrusion for forming a seventh positioning column received in the seventh positioning hole; the sixth fixing portion is provided with an eighth positioning hole, and the second enclosing plate is provided with a protrusion for forming an eighth positioning column received in the eighth positioning hole; the sixth fixing piece is provided with a ninth positioning hole, and the frame body is provided with a protrusion for forming a ninth positioning column received in the ninth positioning hole;

the seventh fixing portion is provided with a tenth positioning hole, and the third enclosing plate is provided with a protrusion for forming a tenth positioning column received in the tenth positioning hole; the eighth fixing portion is provided with an eleventh positioning hole, and the fourth enclosing plate is provided with a protrusion for forming an eleventh positioning column received in the eleventh positioning hole; and the eighth fixing piece is provided with a twelfth positioning hole, and the frame body is provided with a protrusion for forming a twelfth positioning column received in the twelfth positioning hole.

The present invention has the following beneficial effects. In the present invention, the first elastic member and the second elastic member are oppositely arranged at two corners of the mounting framework along the first diagonal, the first elastic member connects the movable holder with the mounting framework by means of the first fixing piece and the second fixing piece, and the second elastic member connects the movable holder with the mounting framework by means of the third fixing piece and the fourth fixing piece. A first elastic piece is further connected between the first fixing piece and the second fixing piece, and a second elastic piece is further connected between the third fixing piece and the fourth fixing piece. When the movable holder rotates about the first diagonal by a movement amount for compensating for the external shake, the first elastic piece and the second elastic piece are deformed accordingly, and deformation restoring forces of the first elastic piece and the second elastic piece can thus drive the movable holder to reset about the first diagonal. A third elastic member and a fourth elastic member are arranged at two corners of the movable holder along a second diagonal, the third elastic member connects the movable holder with the frame by means of a fifth fixing piece and a sixth fixing piece, and the fourth elastic member connects the movable holder with the frame by means of a seventh and an eighth fixing piece. A third elastic piece is further connected between the fifth fixing piece and the sixth fixing piece, and a fourth elastic piece is further connected between the seventh fixing piece and the eighth fixing piece. When the frame rotates about the second diagonal by a movement amount for compensating for the external shake, the third elastic piece and the fourth elastic piece are deformed accordingly, and deformation restoring forces of the third elastic piece and the fourth elastic piece can thus drive the frame to reset about the second diagonal. According to this technical scheme, the first elastic member, the second elastic member, the third elastic member and the fourth elastic member in a thin piece form ensure that relatively stable rotation and relatively stable reset can be realized between the movable holder and the mounting framework, and between the movable holder and the frame; and on the other hand, the thickness of the photographing lens is reduced, so that the photographing lens meets the requirement of ultra-thinness, and the technical problems of complex structure and increased thickness of the photographing lens in the related art for realizing the rotational reset of the lens module are solved.

Figure 1:
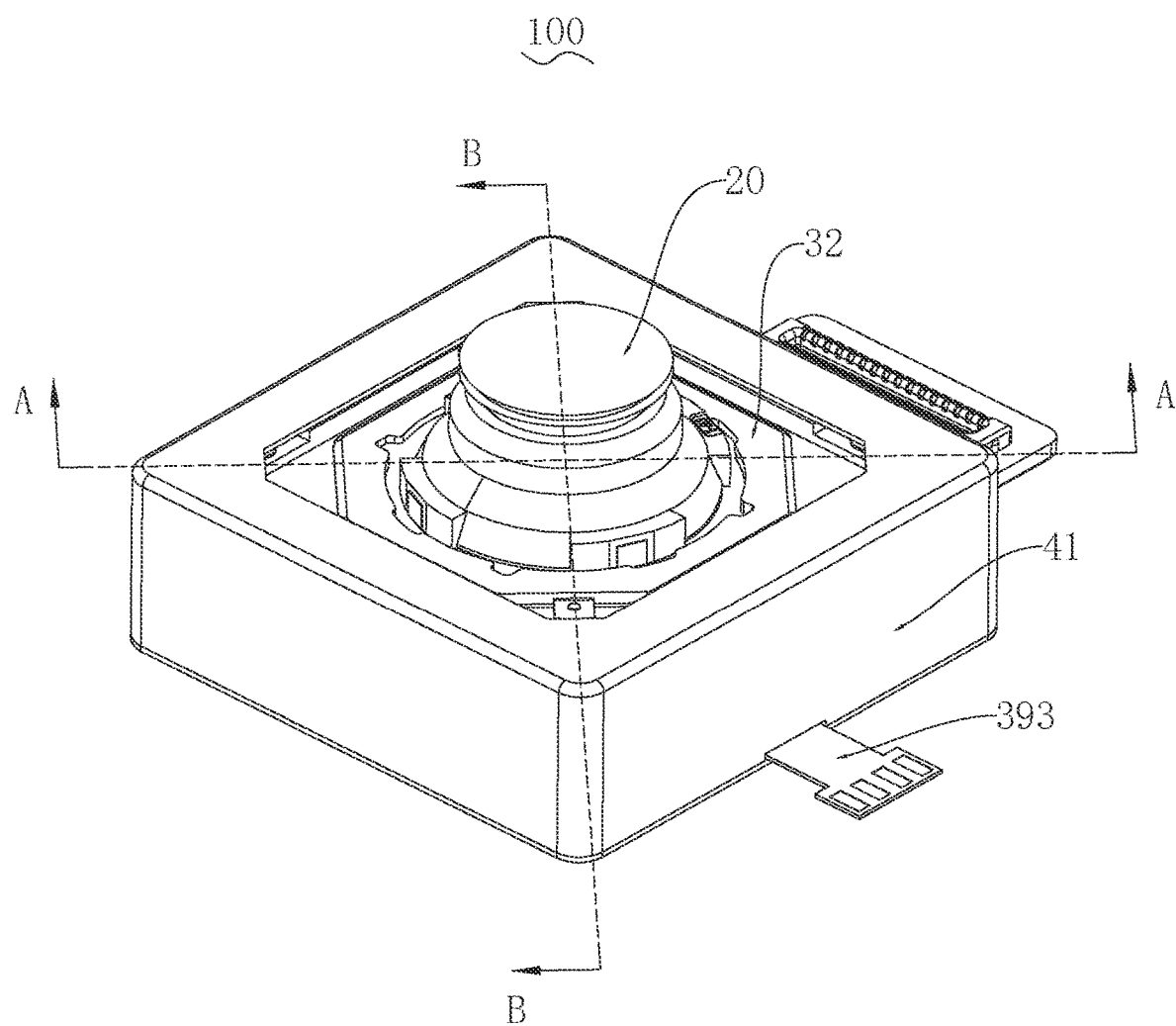
FIG. 1 is a schematic view of the overall structure of a photographing lens of the present invention.

In the accompanying drawings:
100. Photographing lens; 10. Mounting framework; 10a. First clearance groove; 10b. Second clearance groove; 10c. First rotation groove; 10d. Third rotation groove; 11. First border plate; 111. First positioning column; 12. Second border plate; 121. Fourth positioning column; 13. Third border plate; 131. Fifth positioning column; 14. Fourth border plate; 141. Second positioning column; 20. Lens module; 30. Image stabilization module; 31. Movable holder; 31a. Third clearance groove; 31b. Fourth clearance groove; 31c. Fifth rotation groove; 31d. Seventh rotation groove; 311. Movable holder body; 3111. First enclosing plate; 3111a. Seventh positioning column; 3112. Second enclosing plate; 3112a. Eighth positioning column; 3113. Third enclosing plate; 3113a. Tenth positioning column; 3114. Fourth enclosing plate; 3114a. Eleventh positioning column; 312. First support plate; 3121. Second rotation groove; 3122. Third positioning column; 313. Second support plate; 3131. Fourth rotation groove; 3132. Sixth positioning column; 32. Frame; 321. Frame body; 3211. Ninth positioning column; 3212. Twelfth positioning column; 322. Third support plate; 3221. Sixth rotation groove; 323. Fourth support plate; 3231. Eighth rotation groove; 33. First rotation assembly; 331. First rotating ball; 332. Second rotating ball; 34. Second rotation assembly; 341. Third rotating ball; 342. Fourth rotating ball; 35. First elastic member; 351. First fixing piece; 3511. First fixing portion; 3511a. First positioning hole; 3512. Second fixing portion; 3512a. Second positioning hole; 352. Second fixing piece; 3521. Third positioning hole; 353. First elastic piece; 3531. First elastic arm; 3531a. First bent portion; 3532. Second elastic arm; 3532a. Second bent portion; 36. Second elastic member; 361. Third fixing piece; 3611. Third fixing portion; 3611a. Fourth positioning hole; 3612. Fourth fixing portion; 3612a. Fifth positioning hole; 362. Fourth fixing piece; 3621. Sixth positioning hole; 363. Second elastic piece; 3631. Third elastic arm; 3631a. Third bent portion; 3632. Fourth elastic arm; 3632a. Fourth bent portion; 37. Third elastic member; 371. Fifth fixing piece; 3711. Fifth fixing portion; 3711a. Seventh positioning hole; 3712. Sixth fixing portion; 3712a. Eighth positioning hole; 372. Sixth fixing piece; 3721. Ninth positioning hole; 373. Third elastic piece; 3731. Fifth elastic arm; 3731a. Fifth bent portion; 3731b. Sixth bent portion; 3732. Sixth elastic arm; 3732a. Seventh bent portion; 3732b. Eighth bent portion; 38. Fourth elastic member; 381. Seventh fixing piece; 3811. Seventh fixing portion; 3811a. Tenth positioning hole; 3812. Eighth fixing portion; 3812a. Eleventh positioning hole; 382. Eighth fixing piece; 3821. Twelfth positioning hole; 383. Fourth elastic piece; 3831. Seventh elastic arm; 3831a. Ninth bent portion; 3831b. Tenth bent portion; 3832. Eighth elastic arm; 3832a. Eleventh bent portion; 3832b. Twelfth bent portion; 39. Drive assembly; 391. First image stabilization coil; 392. Second image stabilization coil; 393. Image stabilization circuit board; 394. First magnet; 395. Second magnet; 41. Housing; 42. Bottom plate.

DETAILED DESCRIPTION

In order to facilitate the understanding of the present invention, the present invention will be described below more comprehensively with reference to relevant drawings. Preferred embodiments of the present invention are shown in the accompanying drawings. However, the present invention can be implemented in various other forms and is not limited to the embodiments described herein. On the contrary, the purpose of providing these embodiments is to make the understanding of the disclosure of the present invention more thorough and comprehensive.

It should be noted that when an element is said to be "fixed to" another element, it may be directly situated on another element or there may be an intermediate element. When an element is considered to be "connected to" another element, it may be directly connected to another element or an intermediate element may exist at the same time. As used herein, the terms "vertical", "horizontal", "left", "right" and similar expressions are for illustrative purposes only.

Unless otherwise defined, all the technical and scientific terms used herein have the same meanings as those commonly understood by those skilled in the technical field of the present invention. The terms used in the specification of the present invention are only for the purpose of describing specific embodiments, and are not intended to limit the present invention. As used herein, the term "and/or" includes any and all combinations of one or more related items listed.

Referring to FIGS. 1-8 (through), the present invention provides a photographing lens 100, including a mounting framework 10, a lens module 20 received in the mounting framework 10, and an image stabilization module 30 for driving the lens module 20 to rotate.

The mounting framework 10 has a first diagonal L1 and a second diagonal L2. The image stabilization module 30 includes a movable holder 31 suspended in the mounting framework 10, a frame 32 used for receiving the lens module 20 and suspended in the movable holder 31, a first rotation assembly 33 arranged between the mounting framework 10 and the movable holder 31 along the first diagonal L1, and a second rotation assembly 34 arranged between the movable holder 31 and the frame 32 along the second diagonal L2. That is, the movable holder 31 can rotate about the first diagonal L1 relative to the mounting framework 10 by means of the first rotation assembly 33, and the frame 32 can rotate about the second diagonal L2 relative to the movable holder 31 by means of the second rotation assembly 34, thereby realizing the rotation of the lens module 20 with different degrees of freedom.

The image stabilization module 30 further includes a first elastic member 35 and a second elastic member 36 oppositely arranged at two corners of the mounting framework 10 along the first diagonal L1, and a third elastic member 37 and a fourth elastic member 38 oppositely arranged at two corners of the movable holder 31 along the second diagonal L2. The first elastic member 35 includes a first fixing piece 351 connected to the mounting framework 10, a second fixing piece 352 connected to the movable holder 31, and a first elastic piece 353 connected between the first fixing piece 351 and the second fixing piece 352. The second elastic member 36 includes a third fixing piece 361 connected to the mounting framework 10, a fourth fixing piece 362 connected to the movable holder 31, and a second elastic piece 363 connected between the third fixing piece 361 and the fourth fixing piece 362. The third elastic member 37 includes a fifth fixing piece 371 connected to the movable holder 31, a sixth fixing piece 372 connected to the frame 32, and a third elastic piece 373 connected between the fifth fixing piece 371 and the sixth fixing piece 372. The fourth elastic member 38 includes a seventh fixing piece 381 connected to the movable holder 31, an eighth fixing piece 382 connected to the frame 32, and a fourth elastic piece 383 connected between the seventh fixing piece 381 and the eighth fixing piece 382.

In the present invention, the first elastic member 35 and the second elastic member 36 are oppositely arranged at two corners of the mounting framework 10 along the first diagonal L1, the first elastic member 35 connects the movable holder 31 with the mounting framework 10 by means of the first fixing piece 351 and the second fixing piece 352, and the second elastic member 36 connects the movable holder 31 with the mounting framework 10 by means of the third fixing piece 361 and the fourth fixing piece 362. A first elastic piece 353 is further connected between the first fixing piece 351 and the second fixing piece 352, and a second elastic piece 363 is further connected between the third fixing piece 361 and the fourth fixing piece 362. When the movable holder 31 rotates about the first diagonal L1 by a movement amount for compensating for the external shake, the first elastic piece 353 and the second elastic piece 363 are deformed accordingly, and deformation restoring forces of the first elastic piece 353 and the second elastic piece 363 can thus drive the movable holder 31 to reset about the first diagonal L1. A third elastic member 37 and a fourth elastic member 38 are arranged at two corners of the movable holder 31 along a second diagonal L2, the third elastic member 37 connects the movable holder 31 with the frame 32 by means of a fifth fixing piece 371 and a sixth fixing piece 372, and the fourth elastic member 38 connects the movable holder 31 with the frame 32 by means of a seventh fixing piece 381 and an eighth fixing piece 382. A third elastic piece 373 is further connected between the fifth fixing piece 371 and the sixth fixing piece 372, and a fourth elastic piece 383 is further connected between the seventh fixing piece 381 and the eighth fixing piece 382. When the frame 32 rotates about the second diagonal L2 by a movement amount for compensating for the external shake, the third elastic piece 373 and the fourth elastic piece 383 are deformed accordingly, and deformation restoring forces of the third elastic piece 373 and the fourth elastic piece 383 can thus drive the frame 32 to reset about the second diagonal L2. According to this technical scheme, the first elastic member 35, the second elastic member 36, the third elastic member 37 and the fourth elastic member 38 in a thin piece form ensure that relatively stable rotation and relatively stable reset can be realized between the movable holder 31 and the mounting framework 10, and between the movable holder 31 and the frame 32; and on the other hand, the thickness of the photographing lens 100 is reduced, so that the photographing lens 100 meets the requirement of ultra-thinness, and the technical problems of complex structure and increased thickness of the photographing lens 100 in the related art for realizing the rotational reset of the lens module 20 are solved.

In an embodiment, referring to FIGS. 3-7, 9 and 10, the mounting framework 10 is provided with two clearance grooves, namely a first clearance groove 10a and a second clearance groove 10b, which are oppositely arranged along the first diagonal L1. The movable holder 31 includes a movable holder body 311 received in the mounting framework 10, a first support plate 312 extending from the movable holder body 311 into the first clearance groove 10a, and a second support plate 313 extending from the movable holder body 311 into the second clearance groove 10b. A groove bottom of the first clearance groove 10a is provided with a first rotation groove 10c, and the first support plate 312 is provided with a second rotation groove 3121 opposite the first rotation groove 10c. A groove bottom of the second clearance groove 10b is provided with a third rotation groove 10d, and the second support plate 313 is provided with a fourth rotation groove 3131 opposite the third rotation groove 10d. The first rotation assembly 33 includes a first rotating ball 331 and a second rotating ball 332 arranged at the two corners of the mounting framework 10 along the first diagonal L1. The first rotating ball 331 is partially received in the first rotation groove 10c, and the first rotating ball 331 is partially received in the second rotation groove 3121. The second rotating ball 332 is partially received in the third rotation groove 10d, and the second rotating ball 332 is partially received in the fourth rotation groove 3131.

Therefore, the mounting framework 10 is in rolling contact with the first rotating ball 331 by means of a groove wall and a groove bottom of the first rotation groove 10c, and with the second rotating ball 332 by means of a groove wall and a groove bottom of the third rotation groove 10d. The movable holder 31 is in rolling contact with the first rotating ball 331 by means of a groove wall and a groove bottom of the second rotation groove 3121, and the movable holder 31 is in rolling contact with the second rotating ball 332 by means of a groove wall and a groove bottom of the fourth rotation groove 3131, thereby realizing stable rotation of the movable holder 31 about the first diagonal L1 relative to the mounting framework 10.

The movable holder 31 is provided with two clearance grooves, namely a third clearance groove 31a and a fourth clearance groove 31b, which are oppositely arranged along the second diagonal L2. The frame 32 includes a frame body 321 received in the movable holder 31, a third support plate 322 extending from the frame body 321 into the third clearance groove 31a, and a fourth support plate 323 extending from the frame body 321 into the fourth clearance groove 31b. A groove bottom of the third clearance groove 31a is provided with a fifth rotation groove 31c, and the third support plate 322 is provided with a sixth rotation groove 3221 opposite the fifth rotation groove 31c. A groove bottom of the fourth clearance groove 31b is provided with a seventh rotation groove 31d, and the fourth support plate 323 is provided with an eighth rotation groove 3231 opposite the seventh rotation groove 31d. The second rotation assembly 34 includes a third rotating ball 341 and a fourth rotating ball 342 arranged at the two corners of the movable holder 31 along the second diagonal L2. The third rotating ball 341 is partially received in the fifth rotation groove 31c, and the third rotating ball 341 is partially received in the sixth rotation groove 3221. The fourth rotating ball 342 is partially received in the seventh rotation groove 31d, and the fourth rotating ball 342 is partially received in the eighth rotation groove 3231.

Therefore, the movable holder 31 is in rolling contact with the third rotating ball 341 by means of a groove wall and a groove bottom of the fifth rotation groove 31c, and with the fourth rotating ball 342 by means of a groove wall and a groove bottom of the seventh rotation groove 31d. The frame 32 is in rolling contact with the third rotating ball 341 by means of a groove wall and a groove bottom of the sixth rotation groove 3221, and with the fourth rotating ball 342 by means of a groove wall and a groove bottom of the eighth rotation groove 3231, thereby realizing stable rotation of the frame 32 about the second diagonal L2 relative to the movable holder 31.

In an embodiment, the mounting framework 10 is formed by a first border plate 11, a second border plate 12, a third border plate 13 and a fourth border plate 14 sequentially connected and enclosing a space in the center. The first diagonal L1 extends from the junction of the first border plate 11 and the fourth border plate 14 toward the junction of the second border plate 12 and the third border plate 13, and the second diagonal L2 extends from the junction of the first border plate 11 and the second border plate 12 toward the junction of the third border plate 13 and the fourth border plate 14. see FIGS. 3 and 4 for details.

Figure 2:
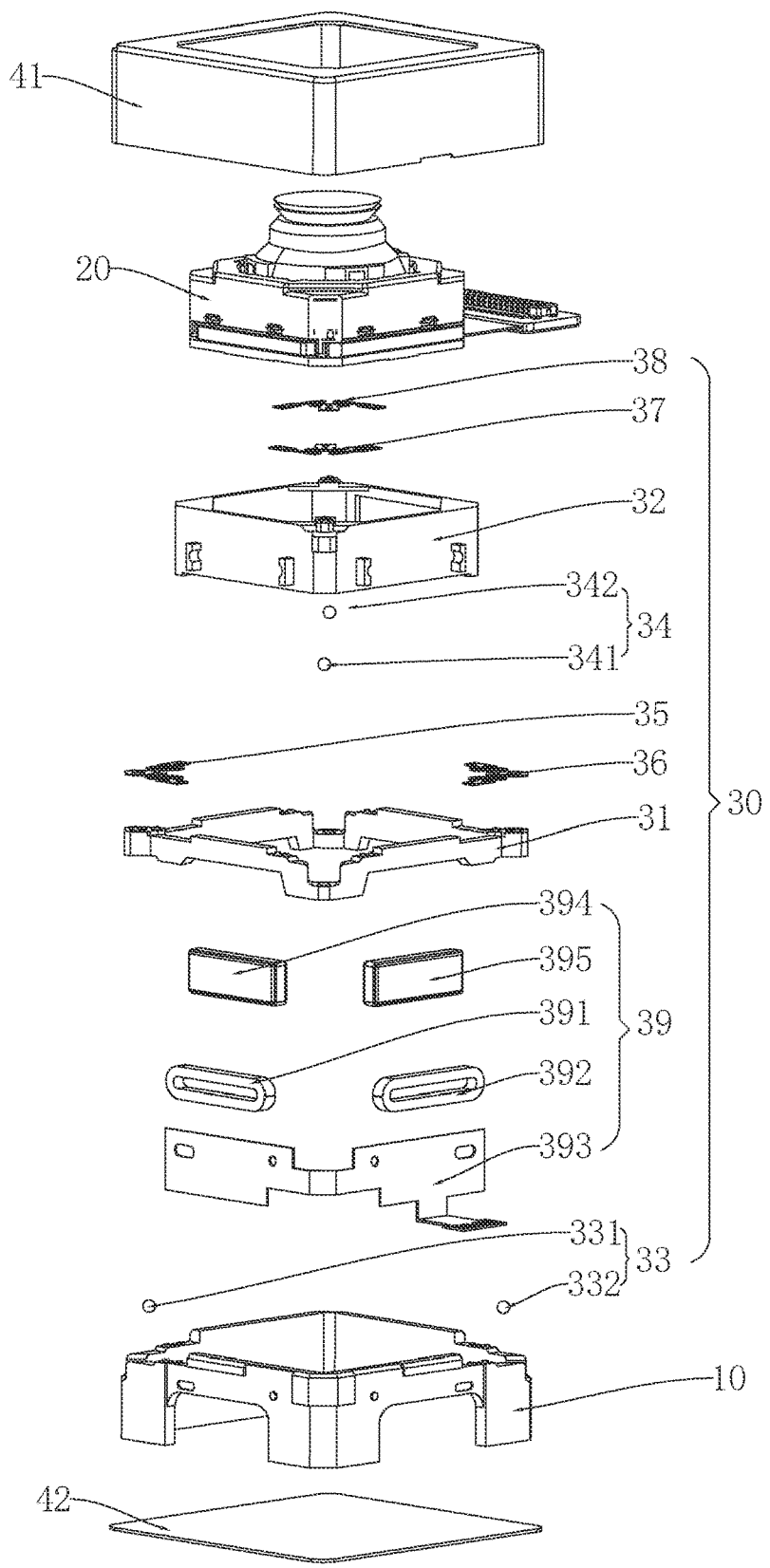
FIG. 2 is a schematic exploded view of the structure in FIG. 1.

Referring to FIG. 2, the image stabilization module 30 further includes a drive assembly 39 for driving the movable holder 31 and the frame 32 to rotate. The drive assembly 39 includes a first image stabilization coil 391 arranged at the first border plate 11, a second image stabilization coil 392 arranged at the second border plate 12, an image stabilization circuit board 393 arranged on the mounting framework 10 and electrically connected to the first image stabilization coil 391 and the second image stabilization coil 392, a first magnet 394 arranged on the frame 32 and opposite the first image stabilization coil 391, and a second magnet 395 arranged on the frame 32 and opposite the second image stabilization coil 392. When the first image stabilization coil 391 and the second image stabilization coil 392 both have counterclockwise current or clockwise current, the movable holder 31 rotates about the first diagonal L1 relative to the mounting framework 10, so as to drive the lens module 20 to rotate about the first diagonal L1. When the first image stabilization coil 391 has clockwise current and the second image stabilization coil 392 has counterclockwise current, or when the first image stabilization coil 391 has counterclockwise current and the second image stabilization coil 392 has clockwise current, the frame 32 rotates about the second diagonal L2 relative to the movable holder 31, so as to drive the lens module 20 to rotate about the second diagonal L2 relative to the mounting framework 10. By means of the interaction between the first image stabilization coil 391 and the first magnet 394, and the interaction between the second image stabilization coil 392 and the second magnet 395, the lens module 20 is controlled to rotate about the first diagonal L1 or the second diagonal L2 by a movement amount for compensating for the external shake, thereby realizing the optical image stabilization function of the lens module 20, keeping an optical path stable and improving the imaging quality.

Figure 3:
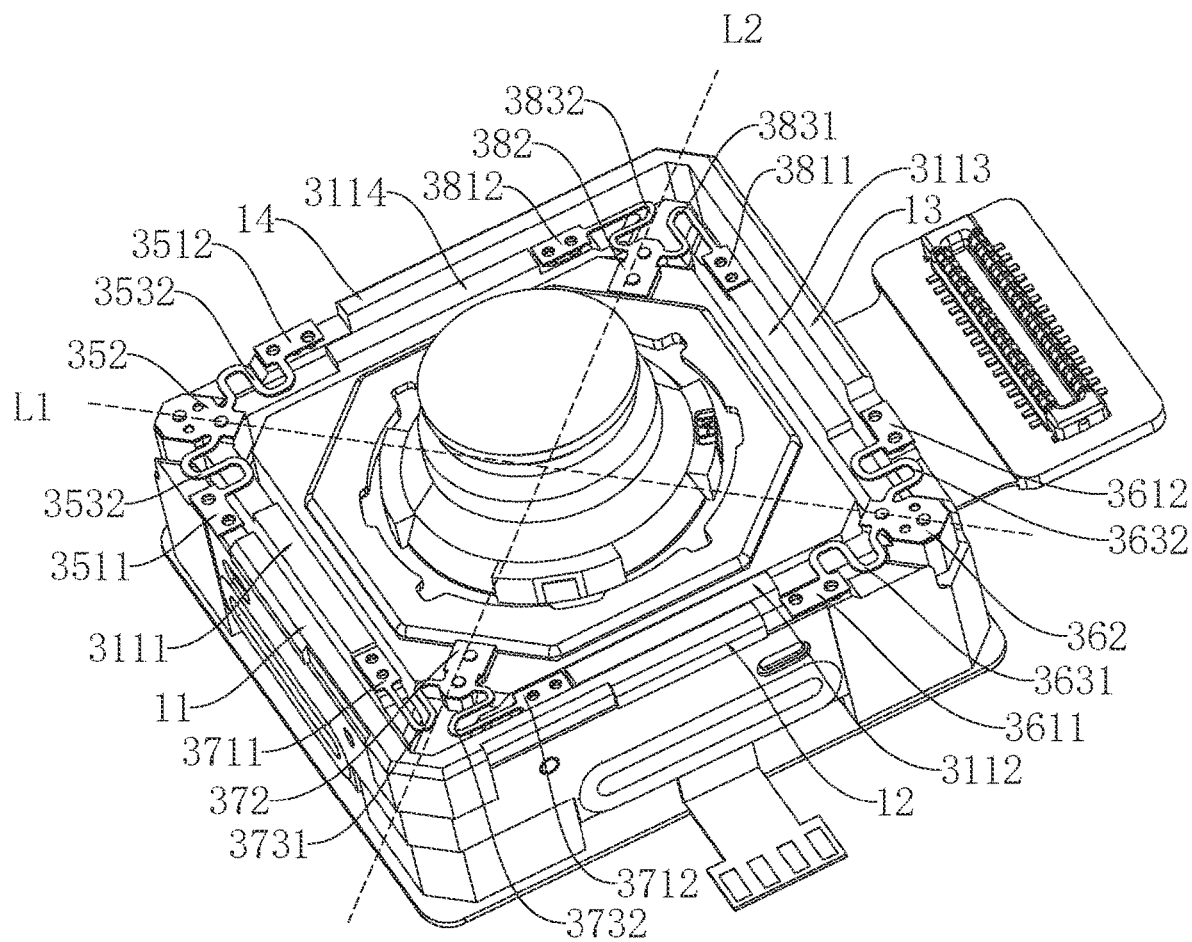
FIG. 3 is a schematic view of the structure of the photographing lens of the present invention with its housing removed.
Figure 4:
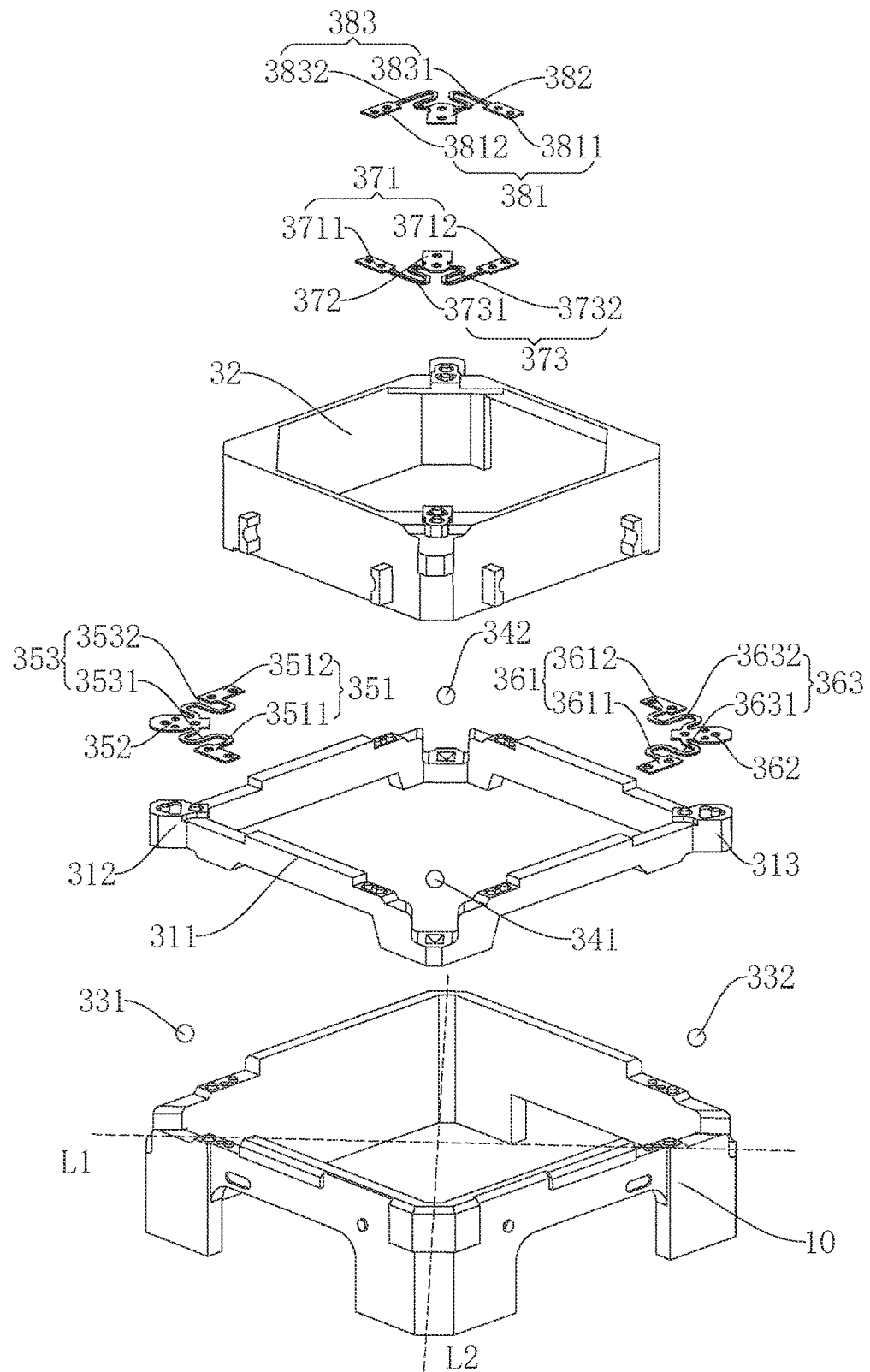
FIG. 4 is a schematic view of part of the structure of the photographing lens of the present invention.
Figure 5:
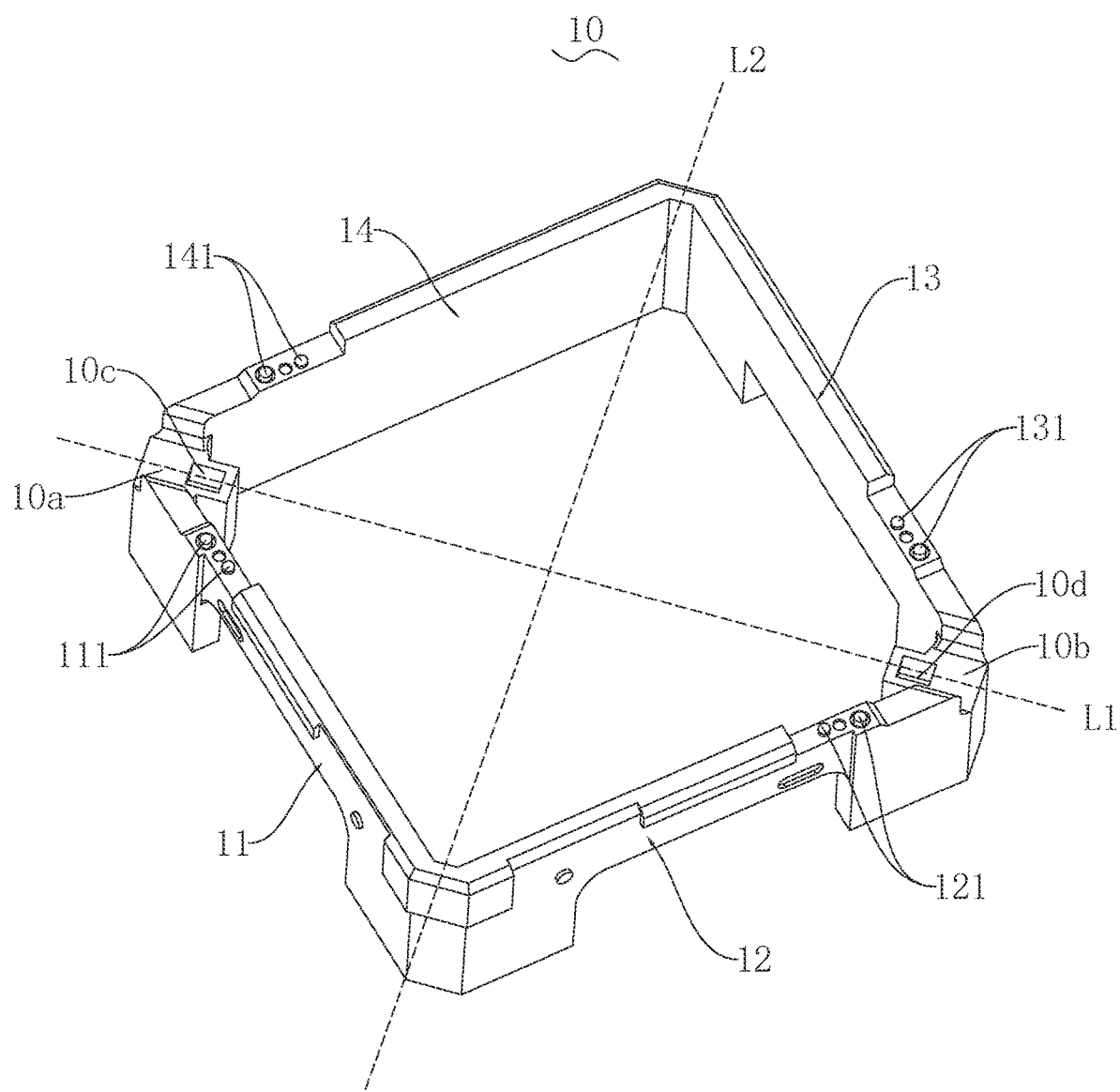
FIG. 5 is a schematic view of the structure of a mounting framework.

In an embodiment, referring to FIGS. 3 and 4, the second fixing piece 352 is fixed to the first support plate 312, and the fourth fixing piece 362 is fixed to the second support plate 313, that is, the second fixing piece 352 and the fourth fixing piece 362 are jointly connected to the movable holder 31 along the first diagonal L1. The sixth fixing piece 372 and the eighth fixing piece 382 are relatively fixed to the frame body 321 along the second diagonal L2, that is, the sixth fixing piece 372 and the eighth fixing piece 382 jointly act on the frame 32 along the second diagonal L2.

Figure 6:
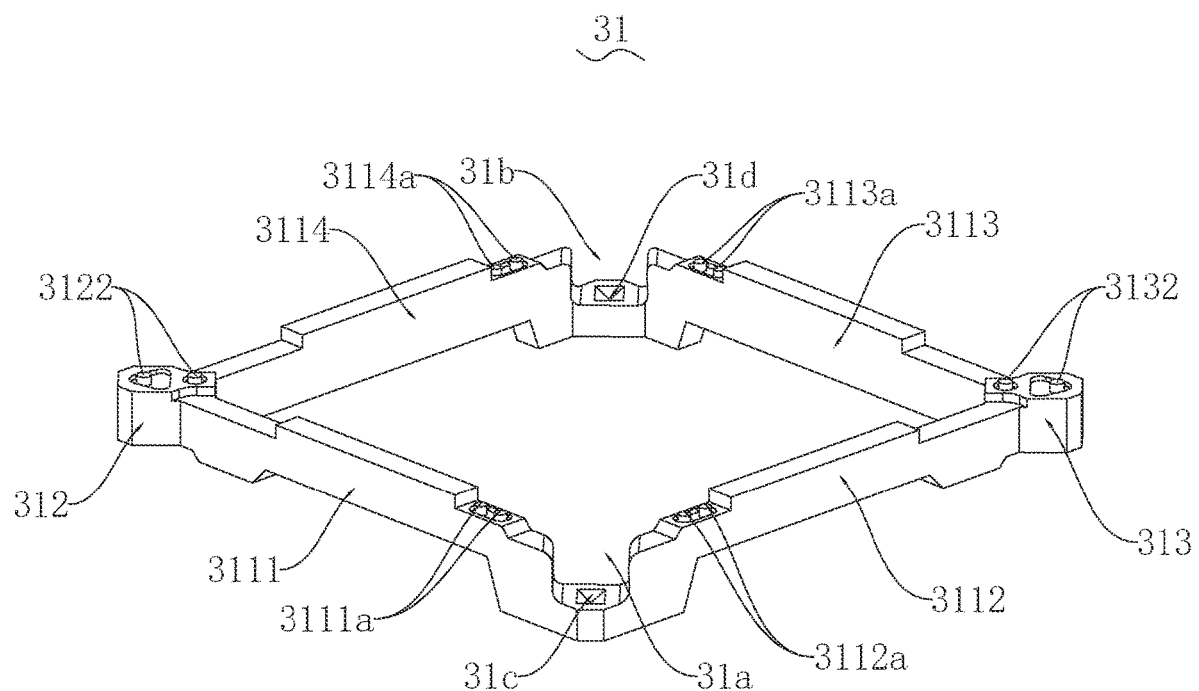
FIG. 6 is a schematic view of the structure of a movable holder.

In some specific embodiments, referring to FIG. 6, the movable holder body 311 includes a first enclosing plate 3111 arranged opposite the first border plate 11, a second enclosing plate 3112 arranged opposite the second border plate 12, a third enclosing plate 3113 arranged opposite the third border plate 13, and a fourth enclosing plate 3114 arranged opposite the fourth border plate 14.

In an embodiment, still referring to FIG. 4, the first fixing piece 351 includes a first fixing portion 3511 connected to the first border plate 11 and a second fixing portion 3512 connected to the fourth border plate 14. The first elastic piece 353 includes a first elastic arm 3531 connected between the first fixing portion 3511 and the second fixing piece 352 and a second elastic arm 3532 connected between the second fixing portion 3512 and the second fixing piece 352. Therefore, the first fixing portion 3511 and the first elastic arm 3531, and the second fixing portion 3512 and the second elastic arm 3532 are separately located on two sides of the second fixing piece 352, that is, the first fixing portion 3511 and the second fixing portion 3512 are separately located on two sides of the first diagonal L1, and the first fixing portion 3511 and the second fixing portion 3512 jointly realize the stable connection between the first elastic member 35 and the mounting framework 10. The first elastic arm 3531 and the second elastic arm 3532 are separately located on the two sides of the first diagonal L1. When the movable holder 31 rotates about the first diagonal L1, the first elastic arm 3531 and the second elastic arm 3532 are both deformed.

The third fixing piece 361 includes a third fixing portion 3611 connected to the second border plate 12 and a fourth fixing portion 3612 connected to the third border plate 13. The second elastic piece 363 includes a third elastic arm 3631 connected between the third fixing portion 3611 and the fourth fixing piece 362 and a fourth elastic arm 3632 connected between the fourth fixing portion 3612 and the fourth fixing piece 362. Therefore, the third fixing portion 3611 and the third elastic arm 3631, and the fourth fixing portion 3612 and the fourth elastic arm 3632 are separately located on two sides of the fourth fixing piece 362, that is, the third fixing portion 3611 and the fourth fixing portion 3612 are separately located on the two sides of the first diagonal L1, and the third fixing portion 3611 and the fourth fixing portion 3612 jointly realize the stable connection between the second elastic member 36 and the mounting framework 10. The third elastic arm 3631 and the fourth elastic arm 3632 are separately located on the two sides of the first diagonal L1. When the movable holder 31 rotates about the first diagonal L1, the third elastic arm 3631 and the fourth elastic arm 3632 are both deformed.

The fifth fixing piece 371 includes a fifth fixing portion 3711 connected to the first enclosing plate 3111 and a sixth fixing portion 3712 connected to the second enclosing plate 3112. The third elastic piece 373 includes a fifth elastic arm 3731 connected to the fifth fixing portion 3711 and the sixth fixing piece 372 and a sixth elastic arm 3732 connected between the sixth fixing portion 3712 and the sixth fixing piece 372. Therefore, the fifth fixing portion 3711 and the fifth elastic arm 3731, and the sixth fixing portion 3712 and the sixth elastic arm 3732 are separately located on two sides of the sixth fixing piece 372, that is, the fifth fixing portion 3711 and the sixth fixing portion 3712 are separately located on two sides of the second diagonal L2, and the fifth fixing portion 3711 and the sixth fixing portion 3712 jointly realize the stable connection between the third elastic member 37 and the movable holder 31. The fifth elastic arm 3731 and the sixth elastic arm 3732 are separately located on the two sides of the second diagonal L2. When the frame 32 rotates about the second diagonal L2, the fifth elastic arm 3731 and the sixth elastic arm 3732 are both deformed.

The seventh fixing piece 381 includes a seventh fixing portion 3811 connected to the third enclosing plate 3113 and an eighth fixing portion 3812 connected to the fourth enclosing plate 3114. The fourth elastic piece 383 includes a seventh elastic arm 3831 connected between the seventh fixing portion 3811 and the eighth fixing piece 382 and an eighth elastic arm 3832 connected between the eighth fixing portion 3812 and the eighth fixing piece 382. Therefore, the seventh fixing portion 3811 and the seventh elastic arm 3831, and the eighth fixing portion 3812 and the eighth elastic arm 3832 are separately located on two sides of the eighth fixing piece 382, that is, the seventh fixing portion 3811 and the eighth fixing portion 3812 are located on two sides of the second diagonal L2, and the seventh fixing portion 3811 and the eighth fixing portion 3812 jointly realize the stable connection between the fourth elastic member 38 and the movable holder 31. The seventh elastic arm 3831 and the eighth elastic arm 3832 are separately located on the two sides of the second diagonal L2. When the frame 32 rotates about the second diagonal L2, the seventh elastic arm 3831 and the eighth elastic arm 3832 are both deformed.

Figure 8:
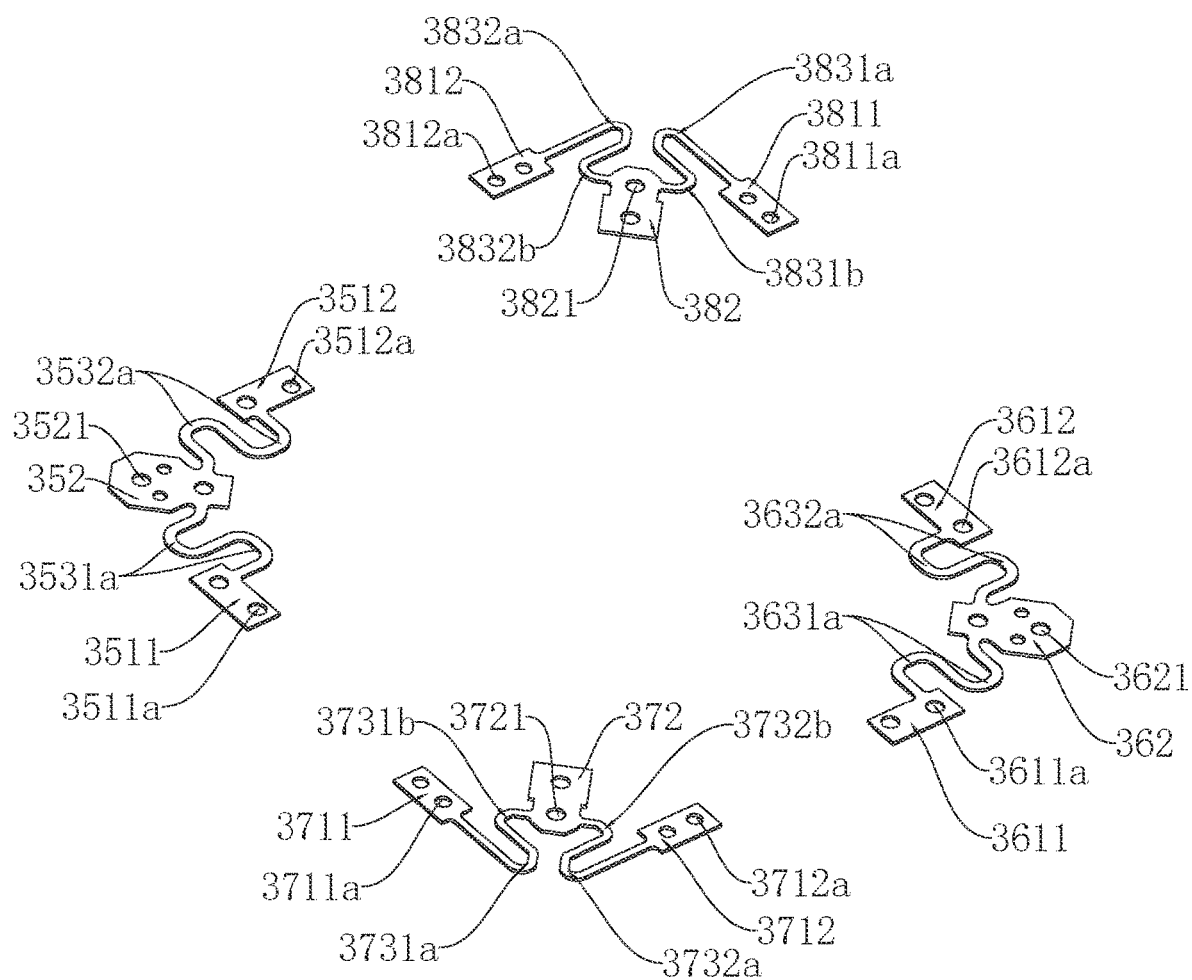
FIG. 8 is a schematic view of the structures of a first elastic member, a second elastic member, a third elastic member and a fourth elastic member.
Figure 9:
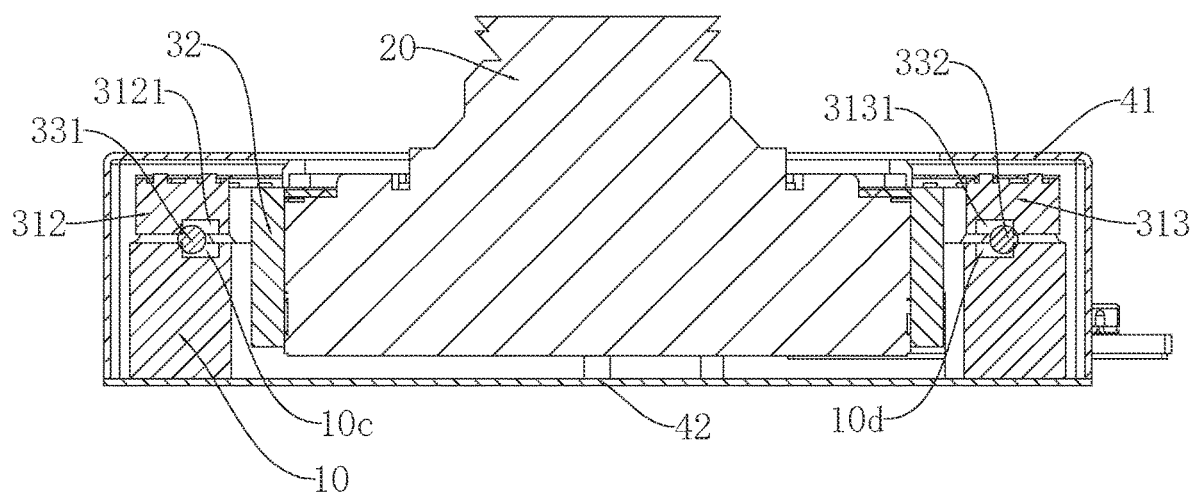
FIG. 9 is a cross-sectional view taken along line A-A in FIG. 1.
Figure 10:
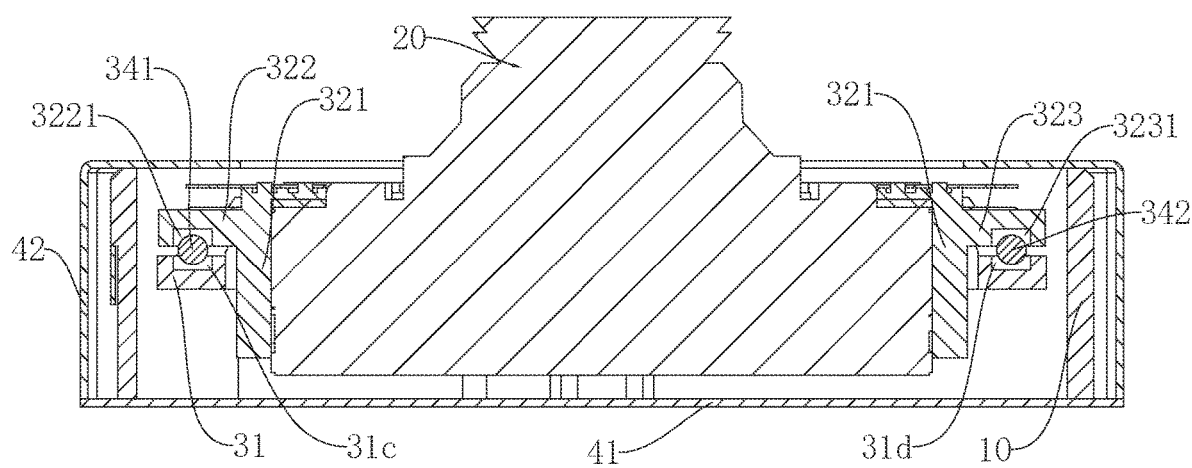
FIG. 10 is a cross-sectional view taken along line B-B in FIG. 1.

Referring to FIG. 8, in an embodiment, the first elastic arm 3531 at least includes two first bent portions 3531a with oppositely orientated openings, and the second elastic arm 3532 at least includes two second bent portions 3532a with oppositely orientated openings, so as to enhance the deformability of the first elastic arm 3531 and the second elastic arm 3532.

The third elastic arm 3631 at least includes two third bent portions 3631a with oppositely orientated openings, and the fourth elastic arm 3632 at least includes two fourth bent portions 3632a with oppositely orientated openings, so as to enhance the deformability of the third elastic arm 3631 and the fourth elastic arm 3632.

In an embodiment, in a direction parallel to a central axis of the lens module 20, one of the first bent portions 3531a at least partially overlaps the first enclosing plate 3111, and the other first bent portion 3531a at least partially overlaps the first border plate 11. Therefore, the first elastic arm 3531 not only has a deformability, but also spatially limits the first border plate 11 and the first enclosing plate 3111 by means of the two first bent portions 3531a.

One of the second bent portions 3532a at least partially overlaps the fourth enclosing plate 3114, and the other second bent portion 3532a at least partially overlaps the fourth border plate 14. Therefore, the second elastic arm 3532 not only has a deformability, but also spatially limits the fourth border plate 14 and the fourth enclosing plate 3114 by means of the two second bent portions 3532a.

One of the third bent portions 3631a at least partially overlaps the second enclosing plate 3112, and the other third bent portion 3631a at least partially overlaps the second border plate 12. Therefore, the third elastic arm 3631 not only has a deformability, but also spatially limits the second border plate 12 and the second enclosing plate 3112 by means of the two third bent portions 3631a.

One of the fourth bent portions 3632a at least partially overlaps the third enclosing plate 3113, and the other fourth bent portion 3632a at least partially overlaps the third border plate 13. The fourth elastic arm 3632 not only has a deformability, but also spatially limits the third border plate 13 and the third enclosing plate 3113 by means of two fourth bent portions 3632a.

Figure 7:
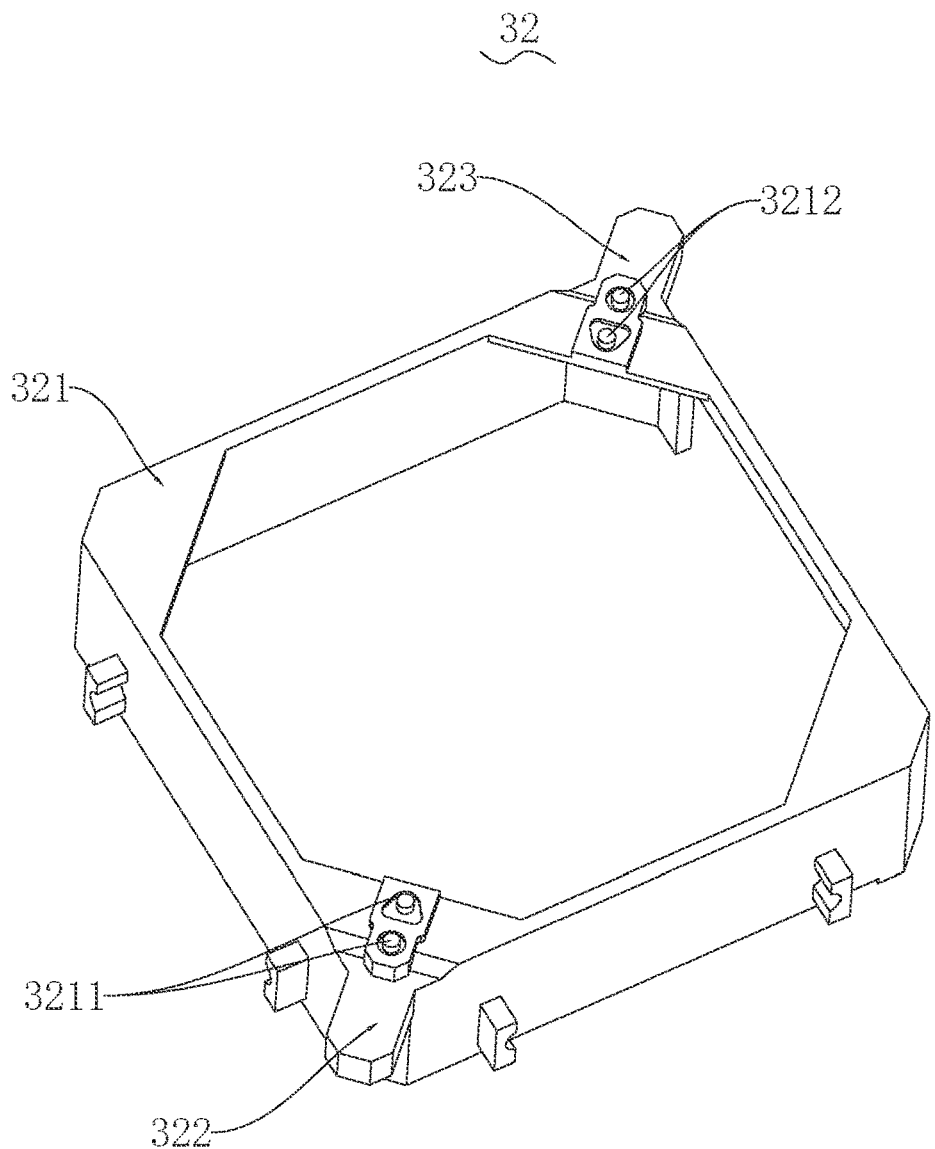
FIG. 7 is a schematic view of the structure of a frame.

In an embodiment, with reference to FIGS. 3, 4 and 7, the fifth elastic arm 3731 includes a fifth bent portion 3731a extending from the fifth fixing portion 3711 along the first enclosing plate 3111 and toward the second diagonal L2, and a sixth bent portion 3731b connected between the fifth bent portion 3731a and the sixth fixing piece 372. The sixth elastic arm 3732 includes a seventh bent portion 3732a extending from the sixth fixing portion 3712 along the second enclosing plate 3112 and toward the second diagonal L2, and an eighth bent portion 3732b connected between the seventh bent portion 3732a and the sixth fixing piece 372. Therefore, the fifth bent portion 3731a and the seventh bent portion 3732a are close to the second diagonal L2. When the frame 32 rotates about the second diagonal L2 relative to the movable holder 31, the deformation amounts of the fifth bent portion 3731a and the seventh bent portion 3732a are small, which can reduce the rotation restoring forces of the fifth bent portion 3731a and the seventh bent portion 3732a to a certain extent, thereby ensuring that the photographing lens 100 can realize image stabilization. On the other hand, the sixth bent portion 3731b is further connected between the fifth bent portion 3731a and the sixth fixing piece 372 to enhance the deformability of the fifth elastic arm 3731. The eighth bent portion 3732b is further connected between the seventh bent portion 3732a and the sixth fixing piece 372 to enhance the deformability of the sixth elastic arm 3732.

The seventh elastic arm 3831 includes a ninth bent portion 3831a extending from the seventh fixing portion 3811 along the third enclosing plate 3113 and toward the second diagonal L2, and a tenth bent portion 3831b connected between the ninth bent portion 3831a and the eighth fixing piece 382. The eighth elastic arm 3832 includes an eleventh bent portion 3832a extending from the eighth fixing portion 3812 along the fourth enclosing plate 3114 and toward the second diagonal L2, and a twelfth bent portion 3832b connected between the eleventh bent portion 3832a and the eighth fixing piece 382. Therefore, the ninth bent portion 3831a and the eleventh bent portion 3832a are close to the second diagonal L2. When the frame 32 rotates about the second diagonal L2 relative to the movable holder 31, the deformation amounts of the ninth bent portion 3831a and the eleventh bent portion 3832a are small, which can reduce the rotation restoring forces of the ninth bent portion 3831a and the eleventh bent portion 3832a to a certain extent, thereby ensuring that the photographing lens 100 can realize image stabilization. On the other hand, the tenth bent portion 3831b is further connected between the ninth bent portion 3831a and the eighth fixing piece 382 to enhance the deformability of the seventh elastic arm 3831. The twelfth bent portion 3832b is further connected between the eleventh bent portion 3832a and the eighth fixing piece 382 to enhance the deformability of the eighth elastic arm 3832.

In an embodiment, in the direction parallel to the central axis of the lens module 20, the fifth bent portion 3731a partially overlaps the first enclosing plate 3111 and partially overlaps the third support plate 322. Therefore, the fifth elastic arm 3731 not only has a deformability, but also spatially limits the first enclosing plate 3111 and the third support plate 322 by means of the fifth bent portion 3731a.

In the direction parallel to the central axis of the lens module 20, the seventh bent portion 3732a partially overlaps the second enclosing plate 3112 and partially overlaps the third support plate 322. Therefore, the sixth elastic arm 3732 not only has a deformability, but also spatially limits the second enclosing plate 3112 and the third support plate 322 by means of the seventh bent portion 3732a.

In the direction parallel to the central axis of the lens module 20, the ninth bent portion 3831a partially overlaps the third enclosing plate 3113 and partially overlaps the fourth support plate 323. Therefore, the seventh elastic arm 3831 not only has a deformability, but also spatially limits the third enclosing plate 3113 and the fourth support plate 323 by means of the ninth bent portion 3831a.

In the direction parallel to the central axis of the lens module 20, the eleventh bent portion 3832a partially overlaps the fourth enclosing plate 3114 and partially overlaps the fourth support plate 323. Therefore, the eighth elastic arm 3832 not only has a deformability, but also spatially limits the fourth enclosing plate 3114 and the fourth support plate 323 by means of the eleventh bent portion 3832a.

In some specific embodiments, the first elastic arm 3531 and the second elastic arm 3532 are symmetrically arranged about the first diagonal L1, and the third elastic arm 3631 and the fourth elastic arm 3632 are symmetrically arranged about the first diagonal L1. In this way, when the movable holder 31 rotates about the first diagonal L1, the deformation amounts of the first elastic arm 3531, the second elastic arm 3532, the third elastic arm 3631 and the fourth elastic arm 3632 are kept balanced.

The fifth elastic arm 3731 and the sixth elastic arm 3732 are symmetrically arranged about the second diagonal L2, and the seventh elastic arm 3831 and the eighth elastic arm 3832 are symmetrically arranged about the second diagonal L2. In this way, when the frame 32 rotates about the second diagonal L2, the deformation amounts of the fifth elastic arm 3731, the sixth elastic arm 3732, the seventh elastic arm 3831 and the eighth elastic arm 3832 can be kept balanced.

In an embodiment, the first fixing portion 3511 is provided with a first positioning hole 3511a, and the first border plate 11 is provided with a protrusion for forming a first positioning column 111 received in the first positioning hole 3511a, so as to realize the connection between the first fixing portion 3511 and the first border plate 11. The second fixing portion 3512 is provided with a second positioning hole 3512a, and the fourth border plate 14 is provided with a protrusion for forming a second positioning column 141 received in the second positioning hole 3512a, so as to realize the connection between the second fixing portion 3512 and the fourth border plate 14. The second fixing piece 352 is provided with a third positioning hole 3521, and the first support plate 312 is provided with a protrusion for forming a third positioning column 3122 received in the third positioning hole 3521, so as to realize the connection between the second fixing piece 352 and the first support plate 312.

The third fixing portion 3611 is provided with a fourth positioning hole 3611a, and the second border plate 12 is provided with a protrusion for forming a fourth positioning column 121 received in the fourth positioning hole 3611a, so as to realize the connection between the third fixing portion 3611 and the second border plate 12. The fourth fixing portion 3612 is provided with a fifth positioning hole 3612a, and the third border plate 13 is provided with a protrusion for forming a fifth positioning column 131 received in the fifth positioning hole 3612a, so as to realize the connection between the fourth fixing portion 3612 and the third border plate 13. The fourth fixing piece 362 is provided with a sixth positioning hole 3621, and the second support plate 313 is provided with a protrusion for forming a sixth positioning column 3132 received in the sixth positioning hole 3621, so as to realize the connection between the fourth fixing piece 362 and the second support plate 313.

The fifth fixing portion 3711 is provided with a seventh positioning hole 3711a, and the first enclosing plate 3111 is provided with a protrusion for forming a seventh positioning column 3111a received in the seventh positioning hole 3711a, so as to realize the connection between the fifth fixing portion 3711 and the first enclosing plate 3111. The sixth fixing portion 3712 is provided with an eighth positioning hole 3712a, and the second enclosing plate 3112 is provided with a protrusion for forming an eighth positioning column 3112a received in the eighth positioning hole 3712a, so as to realize the connection between the sixth fixing portion 3712 and the second enclosing plate 3112. The sixth fixing piece 372 is provided with a ninth positioning hole 3721, and the frame body 321 is provided with a protrusion for forming a ninth positioning column 3211 received in the ninth positioning hole 3721, so as to realize the connection between the sixth fixing piece 372 and the frame body 321.

The seventh fixing portion 3811 is provided with a tenth positioning hole 3811a, and the third enclosing plate 3113 is provided with a protrusion for forming a tenth positioning column 3113a received in the tenth positioning hole 3811a, so as to realize the connection between the seventh fixing portion 3811 and the third enclosing plate 3113. The eighth fixing portion 3812 is provided with an eleventh positioning hole 3812a, and the fourth enclosing plate 3114 is provided with a protrusion for forming an eleventh positioning column 3114a received in the eleventh positioning hole 3812a, so as to realize the connection between the eighth fixing portion 3812 and the fourth enclosing plate 3114. The eighth fixing piece 382 has a twelfth positioning hole 3821, and the frame body 321 is provided with a protrusion for forming a twelfth positioning column 3212 received in the twelfth positioning hole 3821, so as to realize the connection between the eighth fixing piece 382 and the frame body 321.

In some specific embodiments, there are at least two first positioning holes 3511a, second positioning holes 3512a, third positioning holes 3521, fourth positioning holes 3611a, fifth positioning holes 3612a, sixth positioning holes 3621, seventh positioning holes 3711a, eighth positioning holes 3712a, ninth positioning holes 3721, tenth positioning holes 3811a, eleventh positioning holes 3812a and twelfth positioning holes 3821. The number of each positioning hole is defined on the basis that any two distinct points of a straight line completely determine that line, so that the first fixing portion 3511, the second fixing portion 3512, the second fixing piece 352, the third fixing portion 3611, the fourth fixing portion 3612, the fourth fixing piece 362, the fifth fixing portion 3711, the sixth fixing portion 3712, the sixth fixing piece 372, the seventh fixing portion 3811, the eighth fixing portion 3812 and the eighth fixing piece 382 realize a stable positioning connection.

In addition, the photographing lens 100 further includes a housing 41 for covering the mounting framework 10, and a bottom plate 42 for sealing the housing 41.

The various technical features of the embodiments described above can be arbitrarily combined. For the sake of simplicity of description, not all possible combinations of the various technical features of the above embodiments are described; however, combinations of these technical features should be deemed as being within the scope of this specification only if there exists no contradiction therebetween.

The above embodiments only express several implementations of the present invention, and their descriptions are more specific and detailed; however, it should be understood that they are not intended to limit the scope of the patent application. It should be noted that several modifications and improvements may be made by those of ordinary skill in the art without departing from the concept of the present invention. These modifications and improvements all fall within the scope of protection of the present invention. Therefore, the scope of protection of the present invention patent shall be subject to the appended claims.

What is claimed is:

1. A photographing lens, comprising:
a mounting framework having a first diagonal and a second diagonal;
a lens module received in the mounting framework; and
an image stabilization module for driving the lens module to rotate, the image stabilization module comprising:
a movable holder suspended in the mounting framework,
a frame used for receiving the lens module and suspended in the movable holder,
a first rotation assembly arranged between the mounting framework and the movable holder along the first diagonal, and
a second rotation assembly arranged between the movable holder and the frame along the second diagonal,
wherein the image stabilization module further comprises a first elastic member and a second elastic member oppositely arranged at two corners of the mounting framework along the first diagonal, and a third elastic member and a fourth elastic member oppositely arranged at two corners of the movable holder along the second diagonal;
the first elastic member comprises a first fixing piece connected to the mounting framework, a second fixing piece connected to the movable holder, and a first elastic piece connected between the first fixing piece and the second fixing piece;
the second elastic member comprises a third fixing piece connected to the mounting framework, a fourth fixing piece connected to the movable holder, and a second elastic piece connected between the third fixing piece and the fourth fixing piece;
the third elastic member comprises a fifth fixing piece connected to the movable holder, a sixth fixing piece connected to the frame, and a third elastic piece connected between the fifth fixing piece and the sixth fixing piece; and
the fourth elastic member comprises a seventh fixing piece connected to the movable holder, an eighth fixing piece connected to the frame, and a fourth elastic piece connected between the seventh fixing piece and the eighth fixing piece.

2. The photographing lens as described in claim 1, wherein the mounting framework is provided with a first clearance groove and a second clearance groove which are oppositely arranged along the first diagonal; the movable holder comprises a movable holder body received in the mounting framework, a first support plate extending from the movable holder body into the first clearance groove, and a second support plate extending from the movable holder body into the second clearance groove; a groove bottom of the first clearance groove is provided with a first rotation groove, and the first support plate is provided with a second rotation groove opposite the first rotation groove; a groove bottom of the second clearance groove is provided with a third rotation groove, and the second support plate is provided with a fourth rotation groove opposite the third rotation groove;
the movable holder is provided with a third clearance groove and a fourth clearance groove which are oppositely arranged along the second diagonal; the frame comprises a frame body received in the movable holder, a third support plate extending from the frame body into the third clearance groove, and a fourth support plate extending from the frame body into the fourth clearance groove; a groove bottom of the third clearance groove is provided with a fifth rotation groove, and the third support plate is provided with a sixth rotation groove opposite the fifth rotation groove; a groove bottom of the fourth clearance groove is provided with a seventh rotation groove, and the fourth support plate is provided with an eighth rotation groove opposite the seventh rotation groove;
wherein the first rotation assembly comprises a first rotating ball and a second rotating ball, and the second rotation assembly comprises a third rotating ball and a fourth rotating ball; the first rotating ball is partially received in the first rotation groove, and partially received in the second rotation groove; the second rotating ball is partially received in the third rotation groove, and partially received in the fourth rotation groove; the third rotating ball is partially received in the fifth rotation groove, and partially received in the sixth rotation groove; and the fourth rotating ball is partially received in the seventh rotation groove, and partially received in the eighth rotation groove.

3. The photographing lens as described in claim 2, wherein the second fixing piece is fixed to the first support plate, and the fourth fixing piece is fixed to the second support plate; and the sixth fixing piece and the eighth fixing piece are relatively fixed to the frame body along the second diagonal.

4. The photographing lens as described in claim 3, wherein the mounting framework is formed by a first border plate, a second border plate, a third border plate and a fourth border plate sequentially connected and enclosing a space in the center, and the movable holder body comprises a first enclosing plate arranged opposite the first border plate, a second enclosing plate arranged opposite the second border plate, a third enclosing plate arranged opposite the third border plate, and a fourth enclosing plate arranged opposite the fourth border plate;

the first fixing piece comprises a first fixing portion connected to the first border plate and a second fixing portion connected to the fourth border plate, and the first elastic piece comprises a first elastic arm connected between the first fixing portion and the second fixing piece and a second elastic arm connected between the second fixing portion and the second fixing piece;

the third fixing piece comprises a third fixing portion connected to the second border plate and a fourth fixing portion connected to the third border plate, and the second elastic piece comprises a third elastic arm connected between the third fixing portion and the fourth fixing piece and a fourth elastic arm connected between the fourth fixing portion and the fourth fixing piece;

the fifth fixing piece comprises a fifth fixing portion connected to the first enclosing plate and a sixth fixing portion connected to the second enclosing plate, and the third elastic piece comprises a fifth elastic arm connected between the fifth fixing portion and the sixth fixing piece and a sixth elastic arm connected between the sixth fixing portion and the sixth fixing piece; and the seventh elastic piece comprises a seventh fixing portion connected to the third enclosing plate and an eighth fixing portion connected to the fourth enclosing plate, and the fourth elastic piece comprises a seventh elastic arm connected between the seventh fixing portion and the eighth fixing piece and an eighth elastic arm connected between the eighth fixing portion and the eighth fixing piece.

5. The photographing lens as described in claim 4, wherein the first elastic arm at least comprises two first bent portions with oppositely orientated openings, and the second elastic arm at least comprises two second bent portions with oppositely orientated openings; and the third elastic arm at least comprises two third bent portions with oppositely orientated openings, and the fourth elastic arm at least comprises two fourth bent portions with oppositely orientated openings.

6. The photographing lens as described in claim 5, wherein in a direction parallel to a central axis of the lens module, one of the first bent portions at least partially overlaps the first enclosing plate, and the other first bent portion at least partially overlaps the first border plate; one of the second bent portions at least partially overlaps the fourth enclosing plate, and the other second bent portion at least partially overlaps the fourth border plate; one of the third bent portions at least partially overlaps the second enclosing plate, and the other third bent portion at least partially overlaps the second border plate; and one of the fourth bent portions at least partially overlaps the third enclosing plate, and the other fourth bent portion at least partially overlaps the third border plate.

7. The photographing lens as described in claim 4, wherein the fifth elastic arm comprises a fifth bent portion formed by extending from the fifth fixing portion along the first enclosing plate and toward the second diagonal, and a sixth bent portion connected between the fifth bent portion and the sixth fixing piece; the sixth elastic arm comprises a seventh bent portion formed by extending from the sixth fixing portion along the second enclosing plate and toward the second diagonal, and an eighth bent portion connected between the seventh bent portion and the sixth fixing piece;

the seventh elastic arm comprises a ninth bent portion formed by extending from the seventh fixing portion along the third enclosing plate and toward the second diagonal, and a tenth bent portion connected between the ninth bent portion and the eighth fixing piece; and the eighth elastic arm comprises an eleventh bent portion formed by extending from the eighth fixing portion along the fourth enclosing plate and toward the second diagonal, and a twelfth bent portion connected between the eleventh bent portion and the eighth fixing piece.

8. The photographing lens as described in claim 7, wherein in a direction parallel to a central axis of the lens module, the fifth bent portion partially overlaps the first enclosing plate and partially overlaps the third support plate, and the seventh bent portion partially overlaps the second enclosing plate and partially overlaps the third support plate; and the ninth bent portion partially overlaps the third enclosing plate and partially overlaps the fourth support plate, and the eleventh bent portion partially overlaps the fourth enclosing plate and partially overlaps the fourth support plate.

9. The photographing lens as described in claim 4, wherein the first elastic arm and the second elastic arm are symmetrically arranged about the first diagonal, and the third elastic arm and the fourth elastic arm are symmetrically arranged about the first diagonal; and the fifth elastic arm and the sixth elastic arm are symmetrically arranged about the second diagonal, and the seventh elastic arm and the eighth elastic arm are symmetrically arranged about the second diagonal.

10. The photographing lens as described in claim 4, wherein the first fixing portion is provided with a first positioning hole, and the first border plate is provided with a protrusion for forming a first positioning column received in the first positioning hole; the second fixing portion is provided with a second positioning hole, and the fourth border plate is provided with a protrusion for forming a second positioning column received in the second positioning hole; the second fixing piece is provided with a third positioning hole, and the first support plate is provided with a protrusion for forming a third positioning column received in the third positioning hole;

the third fixing portion is provided with a fourth positioning hole, and the second border plate is provided with a protrusion for forming a fourth positioning column received in the fourth positioning hole; the fourth fixing portion is provided with a fifth positioning hole, and the third border plate is provided with a protrusion for forming a fifth positioning column received in the fifth positioning hole; the fourth fixing piece is provided with a sixth positioning hole, and the second support plate is provided with a protrusion for forming a sixth positioning column received in the sixth positioning hole;

the fifth fixing portion is provided with a seventh positioning hole, and the first enclosing plate is provided with a protrusion for forming a seventh positioning column received in the seventh positioning hole; the sixth fixing portion is provided with an eighth positioning hole, and the second enclosing plate is provided with a protrusion for forming an eighth positioning column received in the eighth positioning hole; the sixth fixing piece is provided with a ninth positioning hole, and the frame body is provided with a protrusion for forming a ninth positioning column received in the ninth positioning hole;

the seventh fixing portion is provided with a tenth positioning hole, and the third enclosing plate is provided with a protrusion for forming a tenth positioning column received in the tenth positioning hole; the eighth fixing portion is provided with an eleventh positioning hole, and the fourth enclosing plate is provided with a protrusion for forming an eleventh positioning column received in the eleventh positioning hole; and the eighth fixing piece is provided with a twelfth positioning hole, and the frame body is provided with a protrusion for forming a twelfth positioning column received in the twelfth positioning hole.

* * * * *